United States Patent [19]

Shirakata

[11] Patent Number: 4,811,235
[45] Date of Patent: Mar. 7, 1989

[54] COORDINATE INTERPOLATION IN NUMERICAL CONTROL APPARATUS

[75] Inventor: Kenji Shirakata, Nagoya, Japan

[73] Assignee: Mitsubishi Denki Kabushiki Kaisha, Tokyo, Japan

[21] Appl. No.: 336

[22] Filed: Jan. 5, 1987

[30] Foreign Application Priority Data

Jan. 14, 1986 [JP] Japan ................................ 61-4355

[51] Int. Cl.$^4$ .............................................. G05B 19/18
[52] U.S. Cl. ............................. 364/474.3; 364/474.36
[58] Field of Search .............. 364/169, 474, 475, 513, 364/723, 731, 815, 474.3, 474.36; 901/15, 16, 17, 18

[56] References Cited

U.S. PATENT DOCUMENTS

| | | | |
|---|---|---|---|
| 4,381,608 | 5/1983 | Thormann et al. | 33/1 MP |
| 4,506,335 | 3/1985 | Magnuson | 364/169 X |
| 4,514,814 | 4/1985 | Evans | 364/138 X |
| 4,521,721 | 6/1985 | Kinoshita | 364/169 X |
| 4,541,060 | 9/1985 | Kogawa | 364/169 X |
| 4,564,914 | 1/1986 | Ballough et al. | 364/475 |
| 4,581,698 | 4/1986 | Jaswa | 364/169 |
| 4,597,040 | 6/1986 | Buizer | 364/169 X |
| 4,616,326 | 10/1986 | Meier et al. | 364/169 X |

*Primary Examiner*—Allen MacDonald
*Attorney, Agent, or Firm*—Sughrue, Mion, Zinn, Macpeak and Seas

[57] ABSTRACT

A rectangular coordinate system instruction is converted into a cylindrical coordinate system instruction which is supplied to a multi-axis machine tool each unit interpolation time, so that planar milling can be realized using a lathe.

1 Claim, 2 Drawing Sheets

COORDINATE INTERPOLATION IN NUMERICAL CONTROL APPARATUS

BACKGROUND OF THE INVENTION

The present invention relates to a numerical control apparatus and, particularly, to such apparatus for a composite machine tool having a rotary axia and a pair of linear axes perpendicular to each other and to the rotary axis, which is capable of simultaneously interpolating the three axes according to a displacement instruction in a rectangular coordinate system which is easily programmable.

In a machine tool such as lathe, a workpiece is machined into a body of revolution and, therefore, a machining operation is controlled in a cylindrical coordinate system according to instructions programmed in a cylindrical coordinate system. When the workpiece is to be machined into a configuration other than a body of revolution, a milling machine having control axes in a rectangular coordinate system is utilized usually.

When the workpiece is to be milled by a lathe with an aid of a numerical control apparatus, it is necessary to transform displacement instructions for the linear axes in the rectangular coordinate system into displacement instructions for a rotary axis and the linear axes in the cylindrical coordinate system, which requires very complicated programming. Since it is usual that such transformation has been performed manually, the number of samplings is limited, causing a machining accuracy to be degraded comparing with a machine tool having control axes in the rectangular coordinate system.

SUMMARY OF THE INVENTION

The present invention was made in view of the problems mentioned above and, therefore, an object of the present invention is to provide a numerical control apparatus for a machine tool, such as lathe having control axes in the cylindrical coordinate system, which is capable of interpolating all of the axes thereof simultaneously to enable a milling operation by automatically transforming an instruction in the rectangular coordinates system which is easy to program into an instruction in the cylindrical coordinate system.

A numerical control apparatus according to the present invention comprises an interpolation circuit responsive to a displacement instruction in a rectangular coordinate system supplied from a machining program for obtaining a coordinate values of a cutting tool after a unit interpolation time, a coordinate transforming circuit for transforming the coordinate values into coordinate values in a cylindrical coordinates system, and an axis displacement calculation circuit responsive to a difference between current cylindrical coordinate values and preceding cylindrical coordinate values for calculating amounts of displacement along the respective axes for the unit interpolation time, so that a workpiece can be milled by a lathe having a rotary axis and two linear axes whose displacement amounts are provided by a simultaneous interpolation.

That is, the numerical control apparatus according to the present invention realizes a milling machining by using a lathe by means of transformation of the displacement instructions in the rectangular coordinate system set in the control apparatus as programmed data in the rectangular coordinate system into displacement instructions in the cylindrical coordinate system, which is supplied to the machine tool.

DETAILED DESCRIPTION OF THE PREFERRED EMBODIMENT

Figure 1:
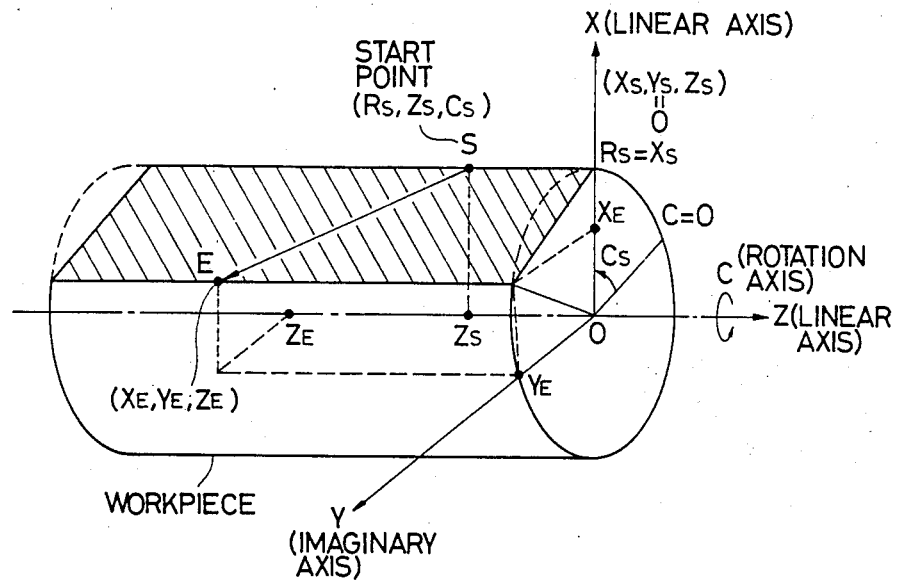
FIG. 1 shows an example of a setting of a workpiece in the rectangular coordinate system, perspectively.

In FIG. 1, a workpiece W is to be machined by a cutting tool (not shown) of a three-axis lathe (not shown) having a rotary axis C and orthogonal axes X and Z orthogonal to the rotary axis C. The cutting tool may be an end mill.

A letter O depicts a center point of a cylindrical coordinate system of a program of the lathe with various points being given by coordinates values (R, Z, C). A cutting tool is firstly moved according to an instruction of an initial setting program GOX($R_S$)Z($Z_S$) to a start point S represented by cylindrical coordinate value $P_S = (R_s, Z_s, C_s)$ by a usual interpolation.

Figure 2:
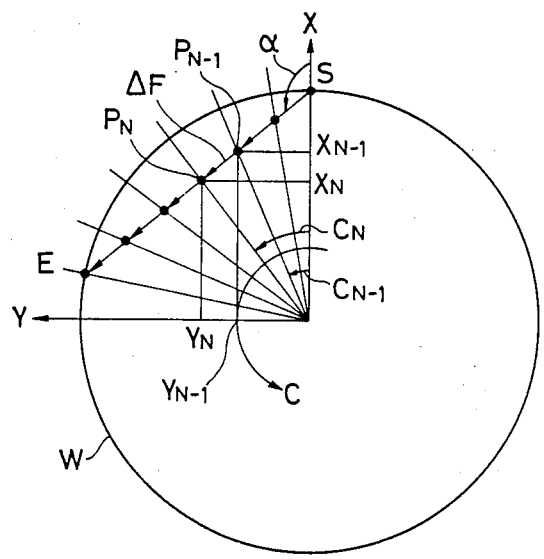
FIG. 2 illustrates a machining scheme for the workpiece in FIG. 1.

In order to obtain a flat surface of the workpiece W shown by hatching, it is performed by using the axes X and $C_O$. In order to move the cutting tool along a straight line SE in FIG. 2, by instructing the axes X and C, it is necessary to instruct them movement blocks ΔF, respectively.

Accoring to the present invention, a linear axis Y orthogonal to the linear axes X and Z is assumed and is instructed. The present numerical control apparatus performs interpolations with the axes X and C by merely instructing end point coordinates E($X_E$, $Y_E$) to control the machine tool such that the cutting tool thereof moves along the straight line SE.

An internal coordinates data of the present numerical control apparatus includes not only the cylindrical coordinate data but also rectangular coordinate data $P_S'(X_S, Y_S, Z_S)$ where $X_S = R_S$ and $Y_S = O$, since the centers of both coordinate systems coincide with each other.

Then, when a first displacement instruction GOX($X_E$)Y($Y_E$) of the rectangular coordinate system is inputted, an interplation represented by equation (1) below is performed in the numerical control apparatus on the basis of amount (ΔF) of displacement per unit interpolation time ΔT, to obtain the coordinates $P_N = (X_N, Y_N, Z_N)$ in the rectangular coordinate system.

$$X_N = X_{N-1} + \Delta F^* \cos\alpha \qquad (1)$$
$$Y_N = Y_{N-1} + \Delta F^* \sin\alpha$$
$$Z_N = Z_{N-1}$$

Assuming L as the displacement amount indicated by the instruction GOX($X_E$)Y($Y_E$).

$$\cos\alpha = (X_E - X_S)/L \text{ and } \sin\alpha = (Y_E - Y_S)/L$$

Then, the coordinate value thus obtained is converted into a coordinate value of the point $P_N = (R_N, Z_N, C_N)$ in the cylindrical coordinate system according to the following equations.

$$R_N = \sqrt{X_N^2 + Y_N^2} \qquad (2)$$

$$Z_N = Z_N$$
$$C_N = \tan^{-1}(Y_N/X_N) * 180/\pi$$

That is, when the cutting tool moves along the X and Z axes by $\Delta R$ and $\Delta Z$, respectively, and the workpiece W rotates by $\Delta C = C_N - C_{N-1}$, the tool moves along the straight line SE to thereby realize a kind of milling.

Figure 3:
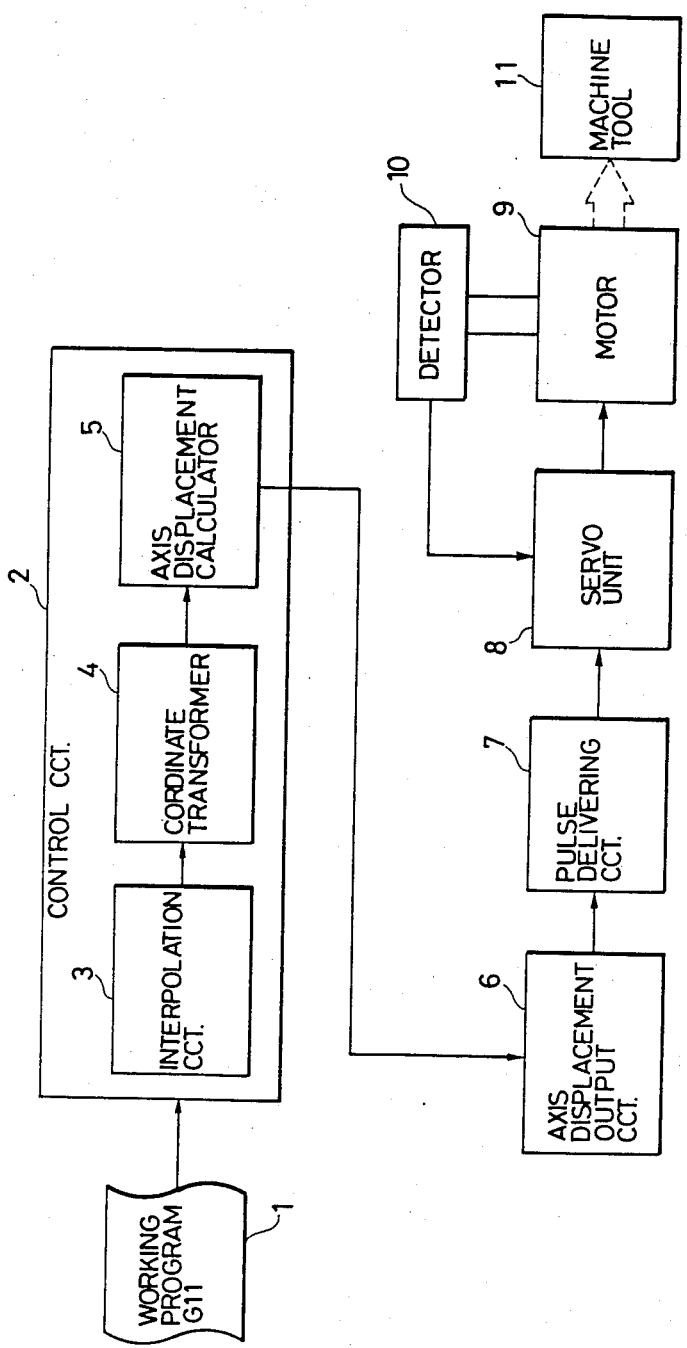
FIG. 3 is a block diagram showing a control apparatus according to the present invention.

FIG. 3 is a block diagram of the numerical control apparatus of the present invention, which comprises a control circuit 2 supplied with a machining program 1. The control circuit 2 comprises an interpolation circuit 3, a coordinate conversion circuit 4 and an axis movement calculation circuit 5. The control apparatus further comprises an axis movement output circuit 6, a pulse delivering circuit 7, a servo unit 8, a motor 9 and a detector 10 associated with the motor which is coupled to the machine tool 11.

In operation, when an instruction G11 of rectangular coordinate system is supplied, movement instructions, X, Y and Z are supplied from the machining porgram to the interpolation circuit 3 in which the interpolation is performed according to the equation (1) to provide coordinate values $X_N$, $Y_N$ and $Z_N$ after a unit intepolation time.

Then these coordinate values are converted in the coordinate conversion circuit 4 into cylindrical coordinate values $R_N$, $Z_N$ and $C_N$ by using the equation (2). The axis movement calculation circuit 5 differentiates these values from preceding values $R_{N-1}$, $Z_{N-1}$, and $C_{N-1}$ to obtain differences $\Delta R$, $\Delta Z$ and $\Delta C$ which are amounts of movements of the tool in the respective axises for unit interpolation time $\Delta T$ and expressed as follows.

$$\Delta R = R_N - R_{N-1}$$
$$\Delta Z = Z_N - Z_{N-1}$$
$$\Delta C = C_N - C_{N-1}$$

These values are supplied to the axis movement output circuit 6 having an output terminal connected to the pulse delivering circuit 7. An output pulse of the pulse delivering circuit 7 is used to actuate the servo unit 8 to thereby drive the motor 9. The detector 10 detects an amount of rotation of the motor which is fedback to the servo unit 8 to regulate the rotation of the motor 10. Thus, the workpiece W is machined with the simultaneous three axis interpolations as if it is interpolated by control axis of the rectangular coordinate system.

Although, in the described emobdiment, G11 is used as the rectangular coordinate system instruction, other G codes which are not used may be used.

As mentioned hereinbefore, according to the present invention, the rectangular coordinate system instruction is converted into the cylindrical coordinate system instruction which is supplied to the machine tool. The transformation is performed every minute interpolation unit time within the apparatus. Therefore, the milling machining can be realized by merely inserting the rectangular coordinate system instruction which is usually easily programmed as the machining program.

What is claimed is:

1. A numerical control apparatus for a composite multi-axis machine tool (11) having a rotary axis (C) and a pair of linear axes (X, Z) orthogonal to each other and to said rotary axis, and including servo drive means (8, 9, 10) for displacing said machine tool along said linear axes and about said rotary axis, comprising: an interpolation circuit (3) responsive to displacement instructions in a rectangular coordinate system inputted from a machining program (1) for generating coordinate values $(X_N, Y_N, Z_N)$ after a unit interpolation time, a coordinate transforming circuit (4) for converting said coordinate values into cylindrical coordinate values $(R_N, Z_N, C_N)$, and an axis displacement calculation circuit (5) responsive to respective differences between said cylindrical coordinate values and preceding cylindrical coordinate values $(R_{N-1}, Z_{N-1}, C_{N-1})$ for calculating amounts of displacement $(\Delta R, \Delta Z, \Delta C)$ in each of said axes for the unit interpolation time such that machining is performed by said machine tool in accordance with a simultaneous three axis interpolation by transforming the displacement instructions of the rectangular coordinate system into displacement instructions of the cylindrical coordinate system, said axis displacement calculation circuit comprising means for supplying linear displacement control signals and non-constant variable rotational displacement control signals to said servo drive means, wherein said machine tool is a three-axis lathe having a rotary cutting tool, linear displacement control is implemented by said servo drive means along said pair of linear axes, and non-constant, variable rotational displacement control is implemented by said servo drive means about said rotary axis to mill a planar surface on a workpiece using said lathe.

* * * * *